United States Patent [19]

Stolarczyk

[11] 4,361,412
[45] Nov. 30, 1982

[54] FASTENER WITH IMPROVED TORQUE TRANSFER SURFACES

[76] Inventor: Gregory Stolarczyk, 12910 Orme Rd., Garfield Heights, Ohio 44125

[21] Appl. No.: 102,102

[22] Filed: Dec. 7, 1979

[51] Int. Cl.$^3$ .............................................. F16B 23/00
[52] U.S. Cl. .................................... 411/402; 81/121 R
[58] Field of Search .................... 85/9 R, 45, 32 R; 81/121 R, 121 A, 71; 411/402, 403, 405, 410, 427

[56] References Cited

U.S. PATENT DOCUMENTS

| | | | |
|---|---|---|---|
| 2,375,249 | 5/1945 | Richer | 85/45 |
| 3,885,480 | 5/1975 | Muenchinger | 85/9 R X |

FOREIGN PATENT DOCUMENTS

| | | | |
|---|---|---|---|
| 666534 | 3/1965 | Belgium | 85/9 R |
| 64946 | 7/1955 | France | 85/45 |
| 1309208 | 10/1962 | France | 85/45 |
| 1398771 | 4/1965 | France | 85/45 |

*Primary Examiner*—Ramon S. Britts

[57] ABSTRACT

A body is provided defining a center axis and having at least four adjacent sides equally spaced from and about the center axis and disposed normal to adjacent 60° relatively angularly displaced radii of the center axis. Each of the sides includes opposite ends and at least the center two sides of the four adjacent sides are interrupted centrally intermediate their opposite ends by a pair of spaced torque transfer surfaces spaced apart generally one-third the length of the corresponding side and equally from the opposite ends thereof. The surfaces are disposed on radii of the center axis. In a first form of the invention only four of the adjacent sides are provided and the end two or remote sides of the four adjacent sides are free of the aforementioned transverse surfaces and the sides face inwardly toward the center axis of the body. In second and third forms of the invention, the sides equal six in number and comprise outwardly and inwardly facing sides, respectively, and each of the sides includes the side interrupting surfaces with the surfaces extending from the sides inwardly toward the center axis. Each pair of surface inner ends are interconnected by an edge extending therebetween disposed generally normal to a radius of the center axis bisecting the edge.

9 Claims, 11 Drawing Figures 4,361,412

FASTENER WITH IMPROVED TORQUE TRANSFER SURFACES

BACKGROUND OF THE INVENTION

This invention relates to improved torque transfer surfaces and is particulary suitable for application to threaded fasteners and to torque tools for driving such fasteners.

Various forms of improved torque transfer surfaces of similar configuration have been heretofore provided such as those disclosed in U.S. Pat. Nos. 3,003,759, 3,342,236, 3,354,757, 3,415,154, 3,664,226 and 3,885,480. Although the latter noted patent includes structural features which are similar in many respects to the instant invention, the latter patent structure does not include features which are also well adapted for use in connection with conventional hexagonal head and socket equipped fasteners and torque tools. Accordingly, a need exists for an improved torque transmission arrangement particularly suitable for application to threaded fasteners and to torque tools for driving such fasteners and yet which may be incorporated into torque tools also adaptable for use in conjunction with conventional hexagonal headed fasteners and the like.

BRIEF DESCRIPTION OF THE INVENTION

The improved torque transfer structure of the instant invention may be incorporated into headed fasteners and torque tools and into torque tools well adapted for use in conjunction with conventional hexagonal headed fasteners. The torque transfer surfaces may be formed by conventional direct trim methods, two-blow heading methods, double trim methods and combination partial extruded groove and two-blow heading methods.

The main object of this invention is to provide an improved torque transmission arrangement for headed fasteners and torque tools and constructed in a manner whereby conventional head-forming methods may be used.

Still another important object of this invention is to provide an improved torque transmission arrangement which may be readily incorporated into box wrenches, socket wrenches, open-end wrenches and Allen-type wrenches and which may further be incorporated into headed fasteners including external torque transfer surfaces as well as headed fasteners including internal torque transfer surfaces.

A final object of this invention to be specifically enumerated herein is to provide an improved torque transmission arrangement in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 9:
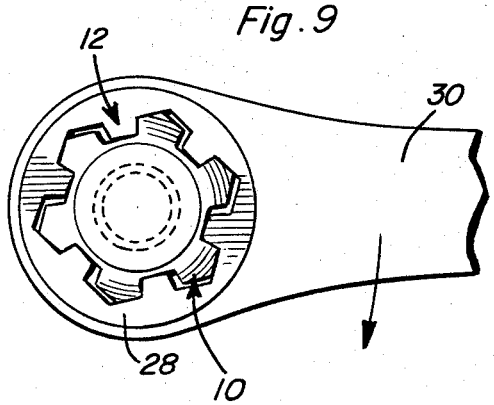
FIG. 9 is an elevational view similar to FIG. 6 but illustrating the manner in which a box wrench constructed in accordance with the present invention may be more effectively engaged with a headed fastener incorporating the instant invention.

Referring now more specifically to the drawings, the numeral 10 generally designates a first member and the numeral 12 generally designates a second member. Although either member 10 and 12 may comprise a fastener and either member 10 and 12 may comprise a wrench portion for turning the associated fastener, in the instance specifically illustrated in FIG. 11, the member 10 comprises the fastener and the member 11 comprises the wrench portion. Accordingly, the combination illustrated in FIG. 11 comprises the same combination illustrated in FIG. 9.

The member 10 includes a body 14 defining a center axis 16 and having six adjacent sides 18 equally spaced from the axis 16 and disposed normal to adjacent 60° relatively angularly displaced radii of the center axis 16. Each of the sides 18 is interrupted centrally intermediate its opposite ends by a pair of spaced torque transfer surfaces 20 spaced apart generally one-third the length of the corresponding side and equally from the opposite ends thereof. The surfaces are disposed on radii of the central axis and extend radially inwardly from the sides and are joined at the inner ends by an edge 22 extending therebetween.

The body 14 comprises the head of a fastener including a threaded shank 24 and the radial extent of the outwardly opening recesses formed by corresponding surfaces 20 and the associated edge 22 is preferably 3/10 the radial distance between the corresponding side 18 and the outside diameter have the shank portion 24. Further, the width of the recess measured peripherally of the head 14 comprises 2/10 the width of the head 14 as measured along a path extending between and normal to diametrically opposite sides 18.

The member 12 comprises the box end of a wrench 30 and defines a center axis substantially corresponding with the center axis 16 and six adjacent sides 30 equally spaced from the center axis and disposed normal to adjacent 60° relatively angularly displaced radii of the center axis. Each of the sides 30 is interrupted centrally intermediate their opposite ends by a pair of spaced torque transfer surfaces 32 and 34 spaced apart generally one-third the length of the corresponding side 30 and equally from the opposite ends thereof. The surfaces are disposed on radii of the center axis of member 12 and extend radially inwardly from the sides 30. The radial inner ends of each pair of surfaces 32 and 34 are interconnected by an edge 35 extending therebetween disposed generally normal to a radii of the center axis 16 bisecting the edge 35.

Figure 11:
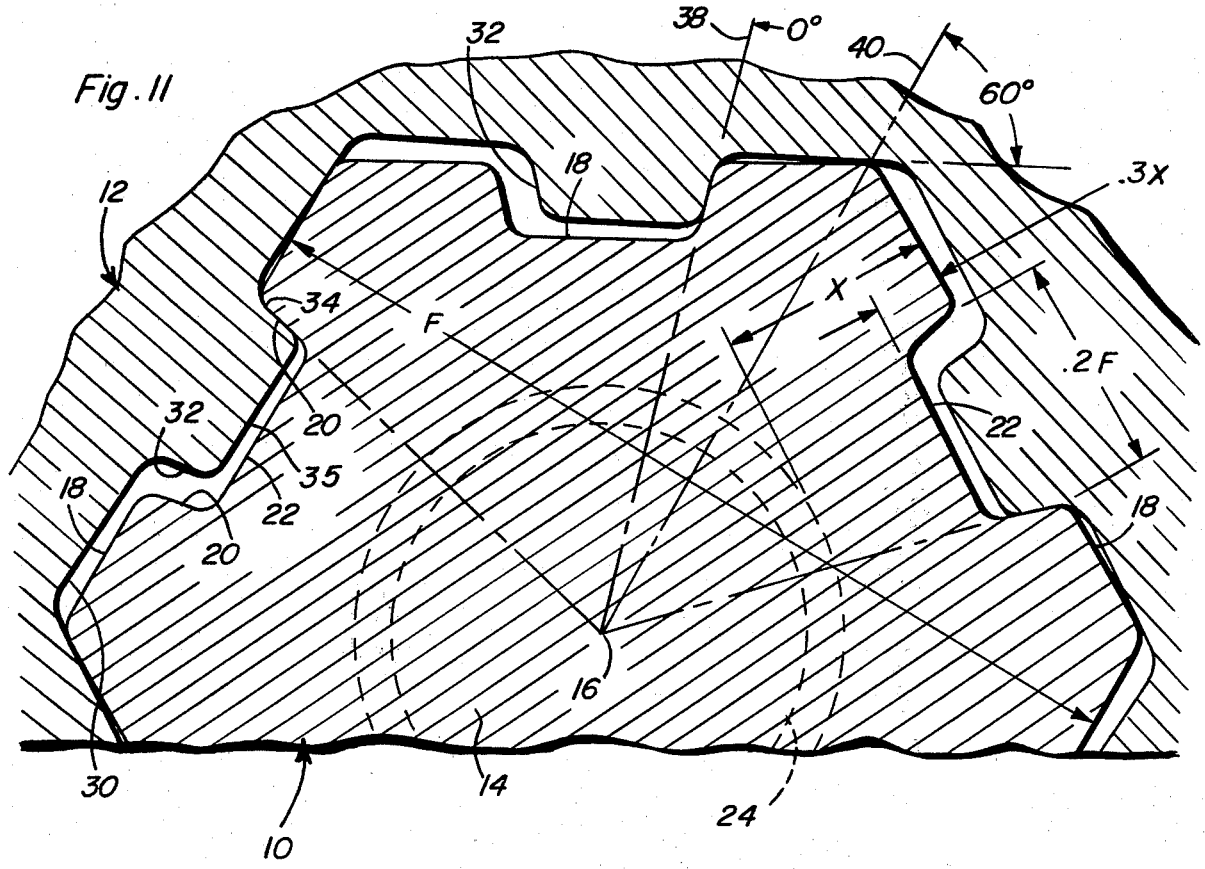
FIG. 11 is a fragmentary enlarged sectional view illustrating the manner in which the various torque transfer surfaces of the box wrench in FIG. 9 are engaged with the opposing torque transfer surfaces of the headed fastener illustrated in FIG. 9.

From FIG. 11 of the drawings, it may be seen that the member 10 may be turned counterclockwise to apply rotational torque to the member 12 through abutting engagement of the surfaces 20 and 34, or that the member 12 may be turned clockwise in order to turn the member 10 clockwise. Inasmuch as the surfaces 20, 32 and 34 are disposed on radii of the center axis 16, the drive angle is zero as is indicated at 38, whereas the drive angle of a conventional hexagonal torque transmitting arrangement is 60° as at 40. Accordingly, the advantages of the instant invention may be readily seen.

Figure 1:
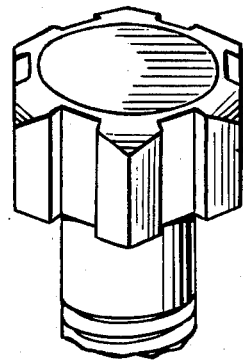
FIG. 1 is a fragmentary perspective view of a headed fastener incorporating the improved torque transverse surfaces of the instant invention and with the headed fasteners being of the type which may be formed through the utilization of direct trim methods.
Figure 2:
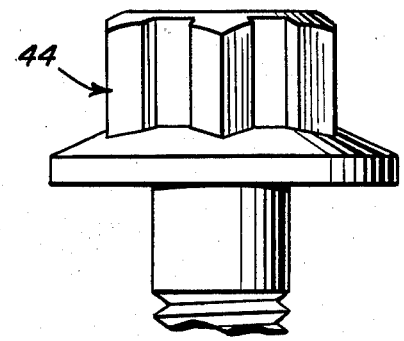
FIG. 2 is a fragmentary side elevational view of a flange headed fastener constructed in accordance with the present invention and of the type which may be formed by the two-blow heading method.

With reference now more specifically to FIG. 1 of the drawings, there may be seen a headed bolt referred to in general by reference numeral 42 and incorporating the instant invention. The headed bolt is of the type formed by the direct trim method. In FIG. 2 of the drawings, the numeral 44 generally designates a flange headed bolt incorporating the instant invention and which may be formed by the two-blow heading method.

Figure 3:
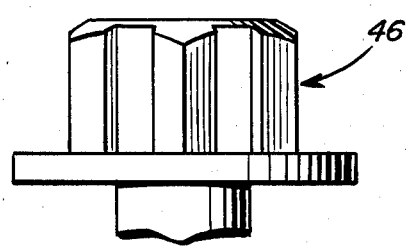
FIG. 3 is a fragmentary side elevational view of a second form of flange headed fastener constructed in accordance with the present invention and which is capable of being formed by the double trim method.
Figure 4:
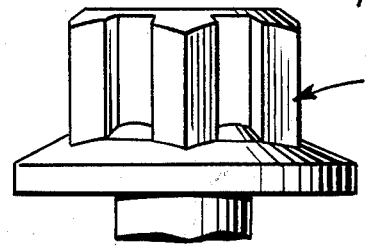
FIG. 4 is a fragmentary side elevational view of a third form of flange headed fastener incorporating the present invention and which may be formed through the utilization of a combination of the partial extruded groove and two-blow heading method.

In FIG. 3 of the drawings, the numeral 46 generally designates a headed flange bolt constructed in accordance with the present invention and which may be formed by the double trim method and FIG. 4 illustrates a flanged headed bolt 48 constructed in accordance with the present invention and which may be formed by a combination of partial extruded grooves and two-blow heading methods.

Figure 5:
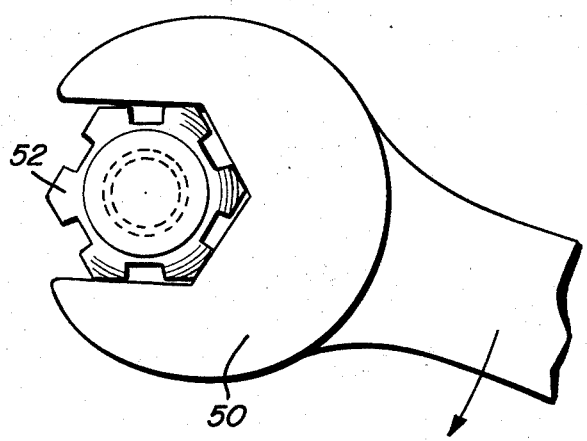
FIG. 5 is an elevational view illustrating the manner in which a headed bolt incorporating the instant invention may be engaged by a conventional open end wrench.
Figure 6:
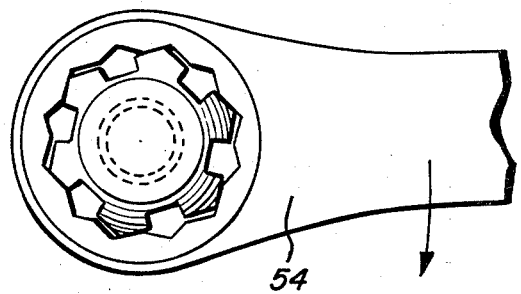
FIG. 6 is an elevational view similar to FIG. 5 illustrating the manner in which a conventional 12-point box wrench may be engaged with a headed fastener constructed in accordance with the present invention.
Figure 7:
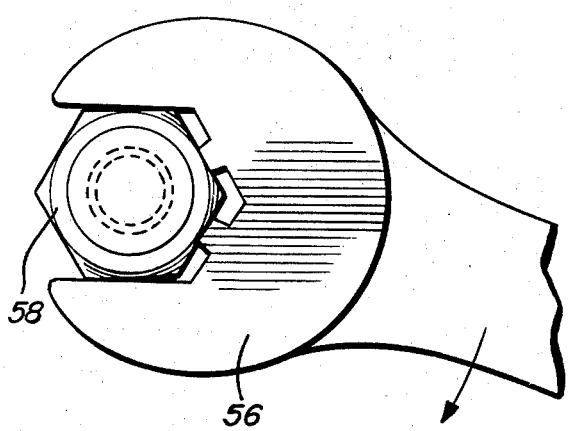
FIG. 7 is a view similar to FIG. 5 but illustrating the manner in which an open end wrench constructed in accordance with the present invention may be engaged with a conventional hexagonal fastener head.
Figure 8:
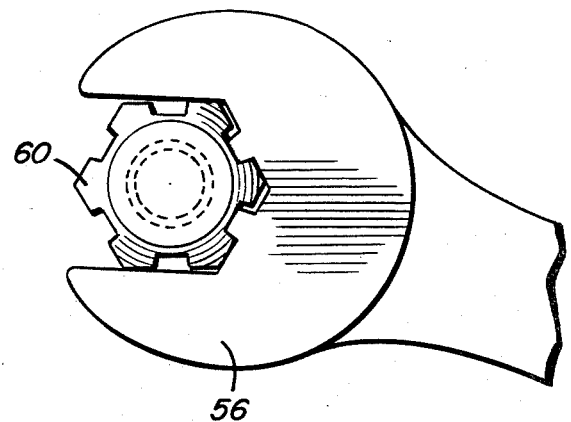
FIG. 8 is a view similar to FIG. 5 illustrating the manner in which an open end wrench constructed in accordance with the present invention may be more effectively engaged with a headed fastener constructed in accordance with the present invention.

With attention now invited more specifically to FIG. 5 of the drawings, it may be seen that the conventional open end wrench 50 may be utilized in conjunction with a bolt head or nut constructed in accordance with the present invention. Further FIG. 6 illustrates that a box wrench 54 may also be utilized and FIG. 7 illustrates wherein an opening end wrench 56 modified in accordance with the present invention may also be utilized in conjunction with a conventional hexagonal bolt head 58. Further, FIG. 8 represents the manner in which modified open end wrench 56 of FIG. 7 may be used advantageously in connection with a bolt head 60 constructed in accordance with the present invention and FIG. 9, as previously set forth, indicates the manner in which a box wrench modified in accordance with the present invention may be used to best advantage in conjunction with a bolt head 10 constructed in accordance with the present invention.

Figure 10:
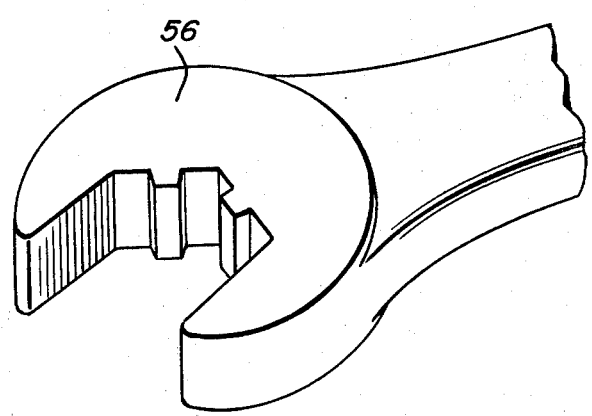
FIG. 10 is a fragmentary perspective view of an end wrench constructed in accordance with the present invention.

From FIG. 10 of the drawings, it may be seen that the open end wrench 56 need only be slightly modified in design to incorporate the instant invention.

It is, of course, pointed out that the member 12 of FIG. 11 may comprise the head of the fastener having a recess formed therein in accordance with the present invention and that the member 10 in FIG. 11 may comprised a modified Allen wrench. Accordingly, it may be seen that the improved torque transfer surfaces of the instant invention may have uses in numerous environments.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a body defining a center axis and having at least four adjacent generally planar sides equally spaced from said axis and disposed normal to adjacent 60° relatively angularly displaced radii of said center axis bisecting said sides, each of said sides having opposite ends and at least the center two sides of said four adjacent sides being interrupted centrally intermediate their opposite ends by a pair of torque transfer surfaces spaced apart generally one-third the length of the correponding sides and equally from the opposite ends thereof, said surfaces being disposed on radii of said center axis.

2. The combination of claim 1 wherein said sides comprise four in number and face inwardly toward said axis and the end two sides of said four adjacent sides are free of said surfaces.

3. The combination of claim 2 wherein said surfaces extend inwardly toward said axis, each pair of surface inner ends being inner connected by an edge extending therebetween disposed at generally normal to a radius of said axis bisecting said edge.

4. The combination of claim 1 wherein said sides equal six in number and face inwardly toward said axis, each of said sides being interrupted centrally intermediate their opposite ends by a pair of said spaced torque transverse surfaces spaced apart generally one-third the length of said sides and equally from the opposite ends of the corresponding side, said surfaces extending inwardly toward said axis and each pair of surface inner ends being interconnected by an edge extending therebetween disposed generally normal to a radius of said axis bisecting said edge.

5. The combination of claim 1 wherein said sides equal six in number and comprise outwardly facing sides facing outwardly of said axis and each of said sides includes said side interrupting surfaces, said surfaces extending from said sides inwardly toward said axis, each pair of surface inner ends being interconnected by an edge extending therebetween and disposed generally normal to a radius of said axis bisecting said edge.

6. The combination of claim 5 wherein said body comprises an internally threaded nut.

7. The combination of claim 5 wherein said body comprises an enlarged head on a threaded shank whose center axis coincides with the center axis of said body.

8. The combination of claim 1 wherein said body comprises one end of an open-end wrench.

9. The combination of claim 1 wherein said sides equal six in number and comprise inwardly facing sides facing inwardly toward said axis and each of said sides includes said side interrupting surfaces, said surfaces extending from said sides inwardly toward said axis, each pair of surface inner end being interconnected by an edge extending therebetween and disposed generally normal to a radius of said axis bisecting said edge, said body comprising one end of a box wrench.

* * * * *